April 27, 1943.                J. M. TYLER                 2,317,500
                             FLEXIBLE SUPPORT
                          Filed June 17, 1939              2 Sheets-Sheet 1
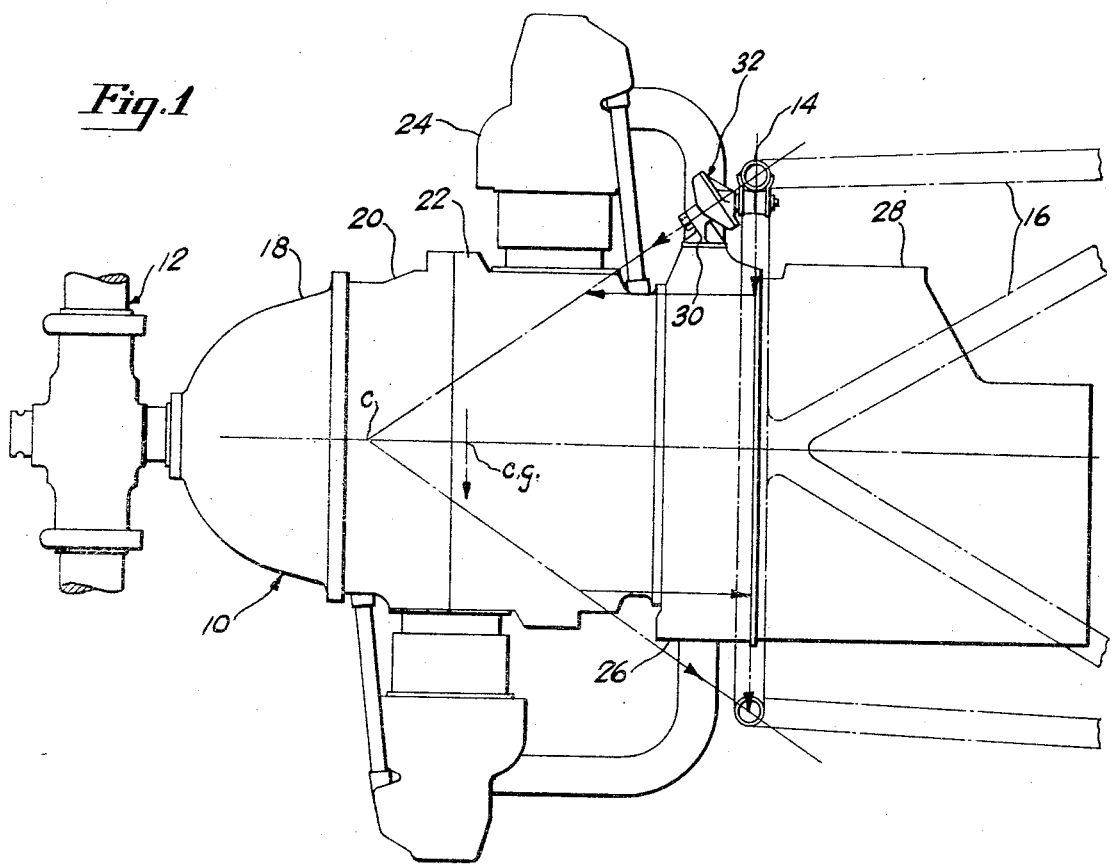
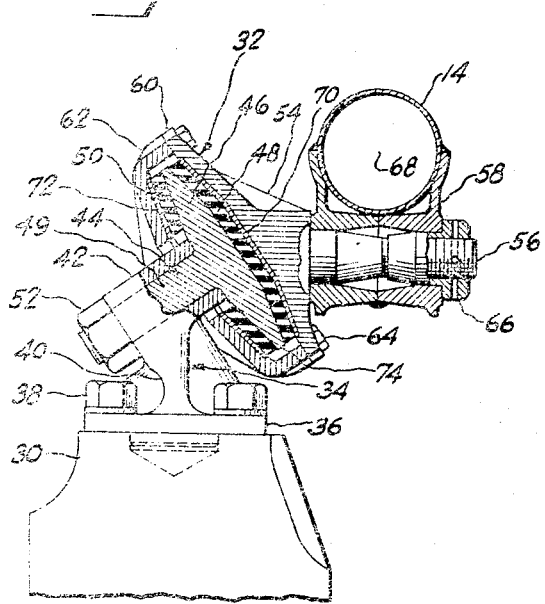
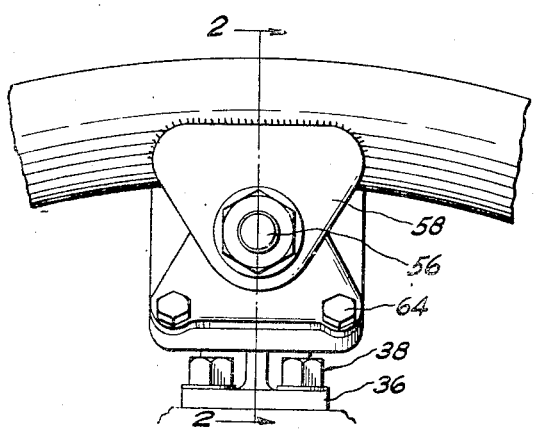
INVENTOR
John M. Tyler
BY
Harris G. Luther
ATTORNEY April 27, 1943.  J. M. TYLER  2,317,500
FLEXIBLE SUPPORT
Filed June 17, 1939  2 Sheets-Sheet 2
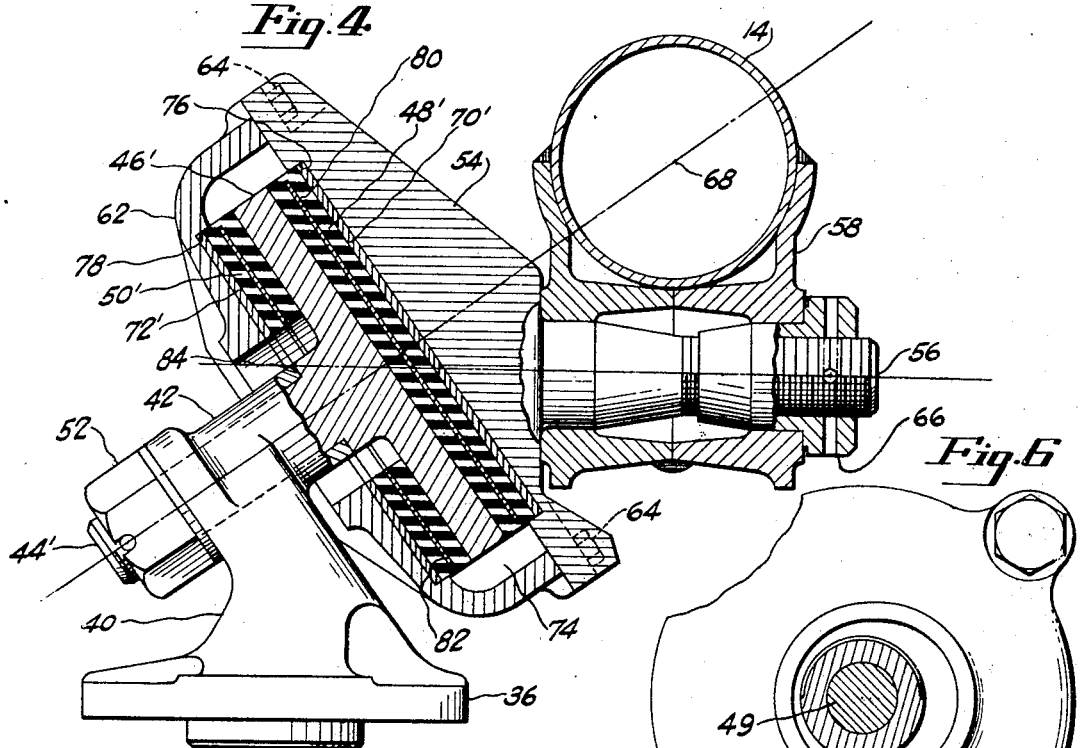
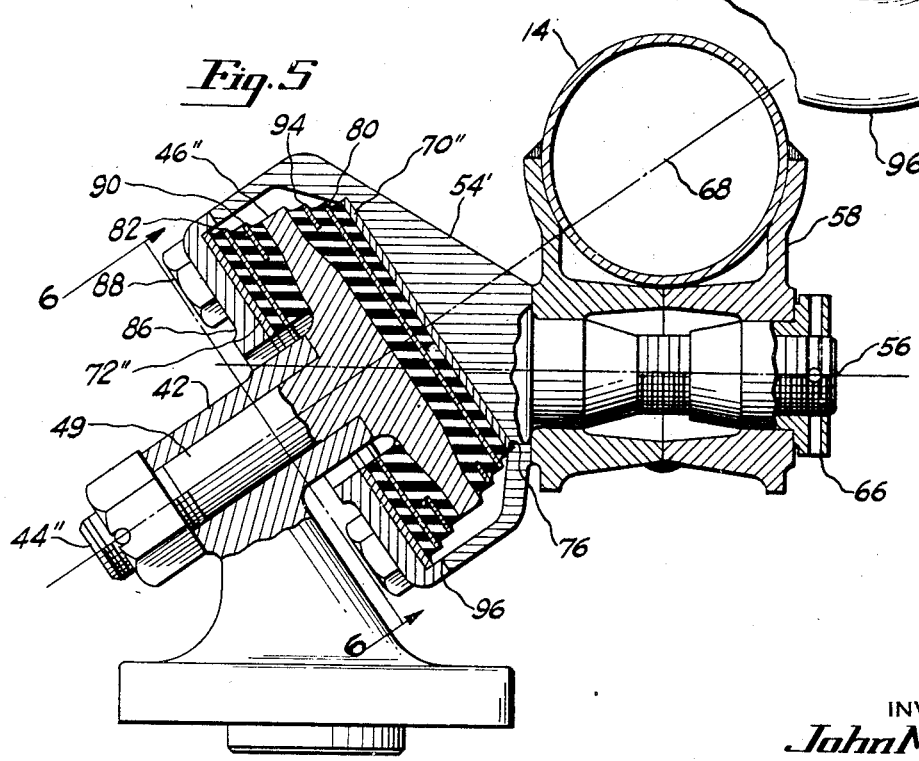
INVENTOR
*John M. Tyler*
BY *Harris G. Luther*
ATTORNEY Patented Apr. 27, 1943

2,317,500

UNITED STATES PATENT OFFICE 2,317,500

FLEXIBLE SUPPORT

John M. Tyler, West Hartford, Conn., assignor to United Aircraft Corporation, East Hartford, Conn., a corporation of Delaware Application June 17, 1939, Serial No. 279,717

11 Claims. (Cl. 248—5)

This invention relates to improvements in resilient engine mounts and has particular reference to improved means for resiliently connecting an internal combustion type vehicle engine to the vehicle.

An object of the invention resides in the provision of an improved resilient engine mount of the character indicated arranged to provide a predetermined resiliency in all directions of movement of the engine relative to its support.

A further object resides in the provision of a resilient engine mount, of the character specified, comprising a plurality of compound brackets incorporating disc type cushions of resilient material, and arranged in a predetermined manner with respect to the engine and its support.

A still further object resides in the provision of an improved resilient engine mount of the character specified comprising a plurality of compound brackets incorporating cushions of resilient material in which the axes perpendicular to the plane of major flexibility of the resilient cushions bear a predetermined angular relation to the engine and its supporting structure to avoid substantial difference in the loads on the various resilient engine mount units in the direction of engine torque.

An additional object resides in the provision of an improved engine mount of the character specified comprising a plurality of compound bracket members incorporating cushions of resilient material in which the resilient cushions are particularly constructed to have a high spring rate in the direction of the thickness of the cushion member and a relatively low spring rate in directions perpendicular to the above mentioned direction.

Other objects and advantages will be more particularly pointed out hereinafter or will become apparent as the description proceeds.

In the accompanying drawings, in which like reference numerals are used to designate similar parts throughout, there is illustrated, in three slightly different forms, a suitable mechanical embodiment for the purpose of disclosing the invention. The drawings, however, are for the purpose of illustration only and are not to be taken as limiting or restricting the scope of the invention since it will be apparent to those skilled in the art that various changes may be made in the illustrated embodiment without in any way exceeding the scope of the invention.

In the accompanying drawings, Fig. 1 is an elevational view of an aircraft engine and an engine support showing the application thereto of resilient engine mounting brackets constructed according to the invention.

Fig. 2 is a vertical sectional view through the resilient mounting bracket taken on the line 2—2 of Fig. 3.

Fig. 3 is a rear elevational view of the mounting bracket shown in section in Fig. 2 looking at the right hand end of the bracket as shown in that figure.

Fig. 4 is a vertical sectional view through a somewhat modified form of engine mounting bracket.

Fig. 5 is a sectional view similar to Fig. 2 through a further modified form of resilient engine mounting bracket, and Fig. 6 is a sectional view on the line 6—6 of Fig. 5.

Referring to the drawings in detail, and particularly to Fig. 1, the numeral 10 generally indicates an engine, such as a radial air-cooled engine conventionally employed for the propulsion of aircraft. It is to be understood, however, that the invention is in no way limited to any particular form of engine and the radial type of aircraft engine has been selected for the purpose of illustration only.

The engine may drive an aeronautical propeller, generally indicated at 12, and may be secured to the aircraft by a suitable supporting structure including the mounting ring 14 and the ring supporting frame formed of a plurality of interbraced struts 16. The engine may have a nose section 18 from which projects the propeller carrying shaft, a valve tappet section 20, a crankcase 22 carrying the cylinders 24 and a blower section 26 secured to the end of the crankcase opposite the end to which the valve tappet section 20 is secured. An accessory section 28 may be connected to the blower section opposite the crankcase and may project through the mounting ring 14. The blower section 26 is provided around its periphery with integral bracket pads 30 to which the resilient mounting brackets, as generally indicated at 32 in Fig. 1, may be attached. These brackets are angularly spaced about the substantially circular blower section in some predetermined angular relation with respect to each other which relation may vary with different installations in which the resilient brackets are used. Each bracket is a compound unit made up of a number of different elements and is rigidly attached at one end to some portion of the engine, such as the blower section 26, and is attached at the opposite end to the engine support, such as the mounting ring 14.

Referring now particularly to Figs. 2 and 3 it will be observed that the resilient mounting bracket therein illustrated comprises a number of separable parts. A base portion 34 having a flat pedestal 36 adapted to be secured to the respective pad 30 by suitable means such as the cap screws 38 is joined by a trunk 40, to a tubular sleeve 42 disposed at an angle to the pedestal 36. A mushroom shaped connecting member, generally indicated at 44, having its head or core portion 46 surrounded by resilient pads 48 and 50 to provide a composite resilient head or plate has its stem portion 49 received in the sleeve 42 and secured therein by a nut 52. The composite plate portion of the connecting member may be in the form of a flat disc or may be of non-circular shape having flat major surfaces perpendicular to the longitudinal center line of the stem 49. An anchor member 54 has a stem 56 secured in the hanger or sleeve 58 rigidly secured to the mount ring 14 and an enlarged slightly concave end portion 60 disposed at an angle to the stem 56; and a cup member 62 enclosing the pads 48 and 50 and the composite head or plate portion 46 of the connecting member 44, is secured to the end 60 of the anchor member by suitable means, such as the cap screws 64 and provided with an aperture surrounding the stem 49 and end of the sleeve 42. Obviously the above described plate and cup portions may be reversed if desired as is apparent from an inspection of Figs. 4 and 5.

The aperture through which the stem 49 and sleeve 42 project may be non-circular to provide a greater freedom of relative movement of the engine attached portion of the bracket with respect to the support attached portion in one direction than in another or, as is particularly shown in Fig. 6, the aperture may be materially larger than the sleeve and the rubber pads may be so formed that the stem 49 and concentric sleeve 42 are disposed to one side of the aperture when the bracket is not loaded by torsional forces and move toward the opposite side of the aperture when torsional load is applied. This construction permits the use of a much smaller housing for the same relative movement of the parts than when the stem is located at the center of the aperture when the bracket is unloaded.

With this arrangement the hanger 58, the anchor member 54 and the cup member 62 when secured rigidly together in assembled relation by the cap screws 64 and the nut 66 constitute in effect a unitary member rigidly secured to the ring 14 while the members 34 and 44, when secured in assembled relation by the nut 52 constitutes in effect a unitary member rigidly secured to the engine by the cap screws 38. The longitudinal axis of the engine attached member coincident with the longitudinal center line of the sleeve 42 is disposed at an angle to the longitudinal axis of the ring attached member coincident with the longitudinal axis of the sleeve 58, and passes substantially through the mean diameter or circumferential axis of the ring, as indicated at 68 in Fig. 2, and intersects the longitudinal axis of the ring attached member within or adjacent to the area of the head 46 of the connection member 44 at the location of the vectorial resultant of the shear forces in the flexible pads 48 and 50 to avoid the imposition of twisting or rotating forces on the connection between the engine attached and ring attached portions of the bracket. The projections of the longitudinal axes of the engine attached members of the brackets on the side of the brackets opposite the mounting ring also intersect at some preselected point which point may in some installations be located within the engine and adjacent to the center of gravity thereof.

The core element 46 of the member 44 is flat and preferably of substantially circular shape and may be beveled on one or both sides from adjacent the center toward the periphery thereof as is clearly shown in Fig. 2. The pads 48 and 50 may be formed of rubber of a selected stiffness to give the proper modulus of elasticity to the resilient mounting and are preferably cemented or vulcanized to the opposite faces of the core member and protected by metal cover plates 70 and 72 vulcanized or otherwise firmly secured thereto. The composite disc including the core element, rubber pads and side cover plates are so positioned that the medial plane of the disc parallel to the surfaces of the cover plates is perpendicular to the longitudinal center line of the engine attached sleeve.

With this arrangement movements of the engine attached portion of the brackets relative to the ring attached portion in the direction of the axis of the engine attached portion are resisted by the resilient pads in compression. Movements of the engine in a torsional direction, however, relative to the mounting ring 14 are resisted by the resilient pads in shear of the material of which they are formed. Thus, the loads incident to the weight of the engine and the thrust developed thereby will be taken by the resilient material in compression while the torque loads will be absorbed in shear of the resilient material. The pads are also so dimensioned as to area and thickness that changes in the compressive loads do not materially change the spring rate of the material in shear, the stiffness in the torsional direction remaining substantially constant even when the compressive load is greatly increased by the momentum of the engine when the direction of travel is suddenly changed as by pulling an airplane out of a steep dive. An annular space, as indicated at 74 is provided between the periphery of the core element 46 and the inner wall of the housing 62 to provide a freedom of resiliently resisted movement of the core and stem 49 in all directions along the medial plane of the disc relative to the housing.

The modified form of resilient mounting bracket shown in Fig. 4 is generally similar to the form illustrated in Figs. 2 and 3 but differs therefrom in certain important details. The head or core element 46' of the connecting member 44' is in the form of a substantially flat circular disc joined at its center to the stem portion of the connecting member and the resilient cushions 48' and 50' are in the form of flat circular pads secured to the opposite faces of the head 46' to provide a composite resilient disc. The anchor member 54 and the cup member 62 which together constitute the housing for encasing the disc are recessed to provide annular shoulders as indicated at 76 and 78 to receive the circular cover plates 70' and 72' of the pads 48' and 50' to locate the resilient disc coaxially of the space provided interiorly of the housing between the cup member 62 and the base plate 64 and provide the annular space 74 of substantially uniform width around the periphery of the head 46.

In this arrangement the resilient pads 48' and 50' are made proportionally thicker than the pads shown in Fig. 2 in order to provide a greater resiliency of the pads in shear of the resilient material and the resiliency of the material in compression is controlled by the insertion in each pad of one or more thin metal stiffening or reinforcing plates, as indicated at 80 and 82. These plates may be vulcanized on each side to the rubber of the pads and may terminate somewhat short of the peripheries of the pads in order that the pads may have integral rubber edge portions. Otherwise the bracket shown in Fig. 4 is substantially similar to that shown in Figs. 2 and 3, the longitudinal center line of the engine attached portion 44 being disposed at an angle to the longitudinal axis passing through the center of gravity of the engine and intersecting said axis the mean diameter or circumferential axis 68 of the engine mount ring, while the axis of the ring attached portion 56 is substantially perpendicular to the plane including the circumferential axis of the mount ring and intersects the axis of the engine attached portion within or near the head 46' of the connecting member 44' at the location of the vectorial resultant of the shear forces in the rubber pads. The cup member 62 is connected to the anchor member 54 by suitable means such as stud bolts 64. The connecting member 44' is inserted through the tubular sleeve 42 and has a shoulder 84 which is clamped against the adjacent end of the tubular sleeve by means of the nut 52 screw threaded upon the projecting end of the stem portion of the connecting member.

In the form shown in Fig. 5 the cup member is formed integrally with the anchor member 54' and its open end is covered by a cover plate 86 secured thereto by the cap screws 88 which are inserted in the opposite direction from the cap screws 64 in the form shown in Figs. 2 and 4. This rearrangement of the cup member provides a construction in which the body portion of the brackets may be disposed closer to the mounting ring 14 and in which the body portion is of considerably smaller outside dimensions, making a particularly useful construction for those installations in which the space between the mounting ring and the engine is seriously limited. The head 46″ of the connecting member 44″ in this arrangement has two or more flat portions separated by an intervening beveled portion or portions to provide space for additional resilient material in the cushion container while maintaining sufficient strength for the head 46″. In this arrangement, in addition to the stiffening plates 80 and 82 stiffening rings as indicated at 90 and 94 are provided to give further control of the modulus of elasticity of the pads when the resilient material is in compression. These stiffening plates and rings may be arranged as may be necessary to provide the desired combination of resiliency in compression and resiliency in shear, in the form illustrated the rings being inserted in the thicker outer portion of the pad where the head 46' is reduced in thickness by bevel portion between the outer portion of the head and the center portion thereof. The side plate 70″ is also made smaller than the side plate 72″ by an amount such that its total area is equal to or greater than the total area of the side plate 72″ allowing for the reduction in area of the side plate 72″ occasioned by the aperture in this plate through which the sleeve 42 projects. This arrangement provides pads of substantially equal resiliency and strength on the opposite sides of the core 46″. In this construction the side plate 70″ is supported against lateral movement by the surrounding annular shoulder 76 provided by forming a suitable recess in the end wall of the anchor member 54' while the cover plate 86 is provided with an upturned flange portion 96 which supports the side plate 72″ against lateral movement.

Where the brackets are arranged about an annular mount ring the stems 56 of all of the ring attached portions are disposed at right angles to the plane including the mean diameter of the ring so that the engine together with the attached brackets may be readily removed from the ring by removing the nuts 66 and then moving the engine away from the ring in a direction perpendicular to the above mentioned plane. Thus, by having the longitudinal center lines of the ring attached portions perpendicular to the plane of the ring and the longitudinal center lines of the engine attached portions disposed at an angle such that projections of these center lines pass through the circumferential axis of the ring, the loads carried by the brackets are transmitted directly to the ring without imposing twisting or bending stresses thereon and at the same time facility in maintenance is provided by having the engine easily removable from the mount ring in the manner described above.

By arranging the brackets in such a manner that the medial planes of the composite resilient discs are perpendicular to lines extending through the centers of the respective discs from a common point on the longitudinal axis passing through the center of gravity of the engine and disposed perpendicular to the plane including the circumferential axis of the mounting ring, to the circumferential axis of the mounting ring at the locations of the respective brackets, and by selecting such common point with respect to the movement imposed on the ring by the weight of the engine and the movements imposed by other forces, such as vibrational rocking couples and inertia forces, inducing pitching or yawing movements of the engine relative to the mounting ring, it is possible to provide an engine suspension for each installation in which all of the forces transmitted through the brackets except the reaction to engine torque and torsional vibrations are transmitted by the resilient material of the composite disc components of the brackets in compression of the resilient material, and all forces incident to engine torque and torsional vibrations are transmitted entirely in shear of the resilient material. This separation of the torsional forces from the other forces transmitted to the engine mount makes possible a highly efficient vibration suppressing engine suspension since the flexibility of the resilient cushions in compression and in shear may be separately controlled. The cushions may also be so portioned and reinforced that changes in the compression loads on the resilient material do not materially change the spring rate of the resilient material in shear.

It is also highly advantageous, particularly in the suspension of aircraft engines, to make the housings separable so that the resilient elements can be readily removed and replaced. In order to support the loads in aircraft installations the bracket parts have to be strong and rugged while their weight and strength must be kept at the minimum consistent with the required strength. These considerations necessitate expensive machined parts of special alloy. Since the resilient connecting member is relatively inexpensive and is the element most subject to deterioration in service, it is highly desirable that these elements be renewable without the necessity of replacing other bracket parts.

While three slightly different mechanical arrangements have been illustrated in the accompanying drawings and hereinabove described for the purpose of disclosing the invention, it is to be understood that the invention is not limited to the particular arrangement so illustrated and described, but that such changes in the size, shape and arrangements of the various parts may be resorted to as come within the scope of the sub-joined claims.

I claim:

1. A bracket for securing an engine to an engine support for limited resiliently resisted freedom of movement of said engine relative to said supports comprising, an engine attached member and a support attached member, a hollow separable housing having an aperture in one side thereof carried by one of said members, a composite disc larger than said aperture but smaller than the interior of said housing disposed in said housing and connected to the other of said members by a stem smaller than said aperture passing through said aperture, said disc comprising a flat metal core element integral with said stem, a flat rubber cushion bonded to each side of said core element, and a metal cover plate bonded to the outer surface of each rubber cushion to provide rigid end surfaces for said cushion receivable in depressions in the inner walls of said housing to center said disc relative to said housing.

2. Means for securing a radial engine to an annular engine support for predetermined freedom of resiliently resisted movements of said engine in various directions relative to said support comprising a bracket including an engine carried sleeve so inclined that an extension of the longitudinal center line thereof intersects both the circumferential axis of said support and an axis passing through the center of gravity of said engine and disposed perpendicular to the plane including said circumferential axis, a second sleeve carried by said support having its center line perpendicular to said plane including said circumferential axis, and means including a composite resilient plate, and a housing encasing said plate connecting said engine carried sleeve to said support carried sleeve.

3. An engine mounting bracket comprising an engine carried sleeve, a support carried sleeve having its center line disposed at an angle to the center line of said engine carried sleeve, and means connecting said sleeves comprising, a composite resilient disc including an integral core element and stem portion and a rubber pad on each side of said core element secured to said engine carried sleeve by said stem portion, an integral cup element and stem secured to said support carried sleeve by said respective stem and receiving said disc, and a separate cover plate for said cup element to retain said disc therein, said cover plate having an aperture for the stem portion of said disc member.

4. In a radial engine mount including a mounting ring substantially concentric with an axis passing through the center of gravity of the engine and disposed to one side of said center of gravity, a plurality of brackets spaced about said ring for connecting said engine to said ring, each bracket including an engine attached member, and a ring attached member, a flat composite plate having a flat metal core imbedded in resilient material carried by one of said members, a plate encasing housing carried by the other of said members, a stem integral with said core passing through a substantially circular aperture in said housing, said plate being so formed that said stem is located at one side of said aperture whenever said bracket is free of engine torque induced load.

5. An engine mount bracket comprising, a member adapted to be connected to an engine, a member adapted to be connected to a support, a hollow housing formed of two separable parts one of which is rigidly attached to one of said members disposed between said members and provided with an aperture through one side thereof, and a composite disc larger than said aperture but smaller than the interior of said housing disposed in said housing and rigidly attached to the other of said members by a stem smaller than said aperture passing through said aperture, said disc comprising a flat metal core element integral with said stem, a flat rubber cushion bonded to each side of said core element, and a metal cover plate bonded to the outer surface of each rubber cushion to provide rigid end surfaces for said cushions receivable in depressions in the end walls of said housing to center said disc relative to said housing.

6. An engine mount bracket comprising, a stem having an enlargement on one end constituting one part of a two part hollow housing, a second part for said housing detachably secured to said stem enlargement and having an aperture therein, a second stem extending through said aperture and having an enlarged head portion within said housing, a flat rubber cushion bonded to each side of said head portion and disposed between said head portion and the adjacent inner surfaces of the ends of said housing, end plates bonded to the outer surfaces of said cushions and received in depressions in said housing to center said head and cushions in said housing and maintain the edges thereof out of contact with the sides of said housing, and a base member secured on said second stem, said housing being so shaped that the center lines of said stems include an obtuse angle between them.

7. The device as set forth in claim 6 in which the depressions and the aperture in the housing and the end plates and said second stem are relatively positioned so that said second stem has an eccentric position in said aperture when said bracket is free of torque induced loads.

8. An engine mount bracket comprising, a stem having an enlargement on one end constituting one part of a two part hollow housing, a second part for said housing detachably secured to said stem enlargement and having an aperture therein, a second stem extending through said aperture and having an enlarged head portion within said housing, a flat rubber cushion bonded to each side of said head portion and disposed between said head portion and the adjacent inner surfaces of the ends of said housing, end plates bonded to the outer surfaces of said cushions and received in depressions in said housing to center said head and cushions in said housing and maintain the edges thereof out of contact with the sides of said housing.

9. An engine mount bracket comprising, a stem having an enlargement on one end constituting one part of a two part hollow housing, a second part for said housing detachably secured to said stem enlargement and having an aperture therein, a second stem extending through said aperture and having an enlarged head portion within said housing said head portion being beveled on at least one side to provide a relatively thick center portion and a relatively thin peripheral portion, a substantially flat rubber cushion bonded to each side of said head portion and disposed between said head portion and the adjacent inner surfaces of the ends of said housing, and end plates bonded to the outer surfaces of said cushions and received in depressions in said housing to center said head and said cushions in said housing and maintain the edges thereof out of contact with the sides of said housing.

10. In a radial engine mount including an annular mounting ring, a plurality of mounting brackets extending between said ring and said engine, each bracket comprising a bolt secured in a ring carried sleeve and carrying a hollow housing, and a bolt secured in an engine attached base member and carrying a resilient composite disc enclosed in said housing, said brackets being so disposed that the axes of the ring attached bolts lie in the surface of a cylinder coaxial with said ring and the axes of said engine attached bolts lie in the surface of a cone also coaxial with said ring and intersecting said cylinder in a circle passing substantially through the centers of all of the resilient composite discs.

11. Resilient means for mounting a power plant comprising a support provided with an opening having a substantially horizontal axis, a member having a substantially horizontally directed stem telescopically received in said opening for releasable and rigid attachment to said support, a cooperating member coupled to the first said member and rigidly attached to said power plant, a resilient element interposed between said members, said element having a principal axis disposed at an acute angle to said horizontal axis, said element being relatively stiff in the direction of said principal axis and relatively flexible in a direction at right angles thereto.

JOHN M. TYLER.